(12) United States Patent  
Lee et al.

(10) Patent No.: US 7,403,249 B2  
(45) Date of Patent: Jul. 22, 2008

(54) LIQUID CRYSTAL DISPLAY

(75) Inventors: Chul Hwan Lee, Kyoungki-do (KR); Kyung Ha Lee, Kyoungki-do (KR)

(73) Assignee: Boe Hydis Technology Co., Ltd. (KR)

(*) Notice: Subject to any disclaimer, the term of this patent is extended or adjusted under 35 U.S.C. 154(b) by 219 days.

(21) Appl. No.: 11/135,990

(22) Filed: May 24, 2005

(65) Prior Publication Data

US 2006/0170852 A1      Aug. 3, 2006

(30) Foreign Application Priority Data

Jan. 29, 2005    (KR) .................... 10-2005-0008365

(51) Int. Cl.
*G02F 1/1337*    (2006.01)
(52) U.S. Cl. .................... 349/123; 349/124
(58) Field of Classification Search .................. 349/123, 349/125

See application file for complete search history.

(56) References Cited

U.S. PATENT DOCUMENTS 5,786,041 A * 7/1998 Takenaka et al. ............. 428/1.2

FOREIGN PATENT DOCUMENTS

KR    1997-004881    4/1997

* cited by examiner

*Primary Examiner*—David C. Nelms
*Assistant Examiner*—David Y Chung
(74) *Attorney, Agent, or Firm*—Seyfarth Shaw LLP

(57) ABSTRACT

Disclosed is an LCD with improved image retention for increased reliability and screen quality. The LCD includes lower and upper substrates provided with predetermined patterns, respectively, and positioned to face each other with a predetermined distance; a liquid crystal layer interposed between the lower and upper substrates; and alignment layers positioned between the lower substrate and the liquid crystal layer and the upper substrate and the liquid crystal layer, respectively, to determine the initial arrangement of liquid crystals. The alignment layers have bubbles formed therein to reduce the capacitance generated by the alignment layers and the difference in level of the lower substrate for improved image retention.

2 Claims, 2 Drawing Sheets

LIQUID CRYSTAL DISPLAY

BACKGROUND OF THE INVENTION

1. Field of the Invention

The present invention relates to a liquid crystal display (LCD), and more particularly to an LCD with improved image retention for increased reliability and screen quality.

2. Description of the Prior Art

A fringe field switching mode (hereinafter, referred to as FFS-mode) LCD has been proposed to improve the low aperture ratio and transmittance of an in-plane switching mode (hereinafter, referred to as IPS-mode) LCD, as disclosed in Korean Patent Application No. 98-9243.

The FFS-mode LCD has counter and pixel electrodes made of a transparent conductor for higher aperture ratio and transmittance than the IPS-mode LCD. Furthermore, the gap between the counter and pixel electrodes is smaller than that between upper and lower substrates to form a fringe field between the counter and pixel electrodes. As a result, all liquid crystal molecules are actuated, including those positioned on top of the electrodes, for improved transmittance.

A conventional FFS-mode LCD will now be described with reference to FIG. 1, which is a sectional view thereof.

As shown in FIG. 1, a black matrix layer 2 is formed on an upper substrate 1 to interrupt transmission of light and a color filter layer 3 including red, green, and blue is formed thereon. An over-coating layer 4 is formed on the black matrix layer 2 and the color filter layer 3. A common electrode 12 is formed on a lower substrate 11 in a plate shape, and a gate insulation layer 13 is formed on the resulting substrate including the common electrode 12. A data line 14 is formed on the gate insulation layer 13, and a protective layer 15 is formed on the resulting substrate including the data line 14. A pixel electrode 16 is formed on the protective layer 15 in a slit shape. Alignment layers 5 and 17 are formed between the upper substrate 1 and a liquid crystal layer 18 and between the lower substrate 11 and the liquid crystal layer 18, respectively, to determine the initial arrangement of liquid crystals.

The conventional FFS-mode LCD, however, has no electrode formed on the upper substrate, in contrast to a TN-mode LCD. Since the black matrix layer and the over-coating layer are made of a material having very high specific resistance, furthermore, image retention is very likely to occur. Particularly, the FFS-mode LCD has a larger capacitor than the TN-mode LCD. The resulting adsorption of impurity ions and the influence of the remaining DC components generate severe image retention.

An alignment agent for forming the alignment layers includes a polymer compound and a solvent for dissolving the polymer compound to improve coating characteristics. The polymer compound is used to align the liquid crystals in a predetermined direction. The solvent is a liquid-state material having low viscosity for easy application of the polymer compound and is used to retain the alignment agent. The alignment agent, including the polymer compound and the solvent, has large specific resistance during application and increases the capacitance inside the LCD. This results in the image retention of the LCD.

SUMMARY OF THE INVENTION

Accordingly, the present invention has been made to solve the above-mentioned problems occurring in the prior art, and an object of the present invention is to provide a LCD with improved image retention for increased reliability and screen quality.

In order to accomplish this object, there is provided an LCD including lower and upper substrates provided with predetermined patterns, respectively, and positioned to face each other with a predetermined distance; a liquid crystal layer interposed between the lower and upper substrates; and alignment layers positioned between the lower substrate and the liquid crystal layer and the upper substrate and the liquid crystal layer, respectively, to determine the initial arrangement of liquid crystals, wherein the alignment layers have bubbles formed therein to reduce the capacitance generated by the alignment layers and the difference in level of the lower substrate for improved image retention.

The alignment layers include a polymer compound for arranging the liquid crystals in a predetermined direction; a first solvent having low viscosity, low specific weight, and high volatility at a temperature of 70-80° C.; and a second solvent having high specific weight and high volatility at a temperature of 100° C. or higher.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
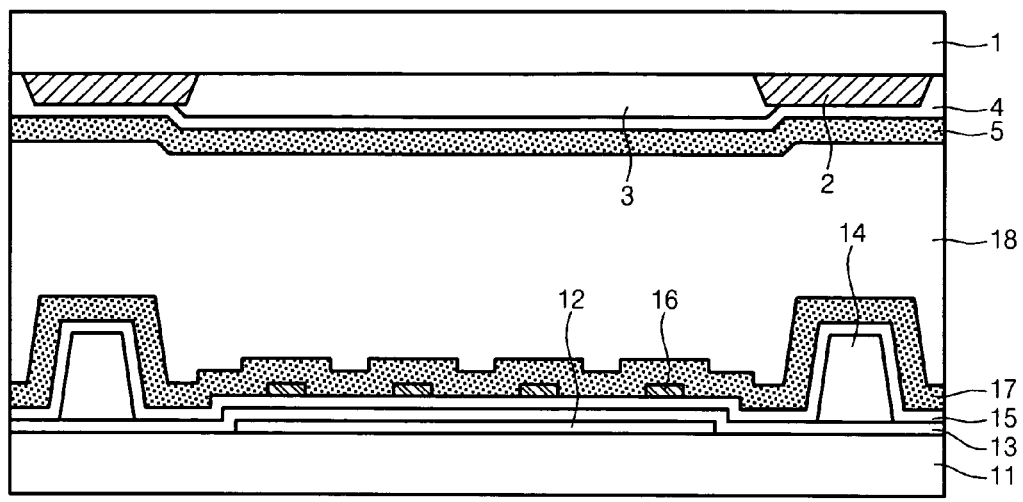
FIG. 1 is a sectional view showing a conventional FFS-mode LCD.

Hereinafter, a preferred embodiment of the present invention will be described with reference to the accompanying drawings. In the following description and drawings, the same reference numerals are used to designate the same or similar components, and so repetition of the description of the same or similar components will be omitted.

Figure 2:
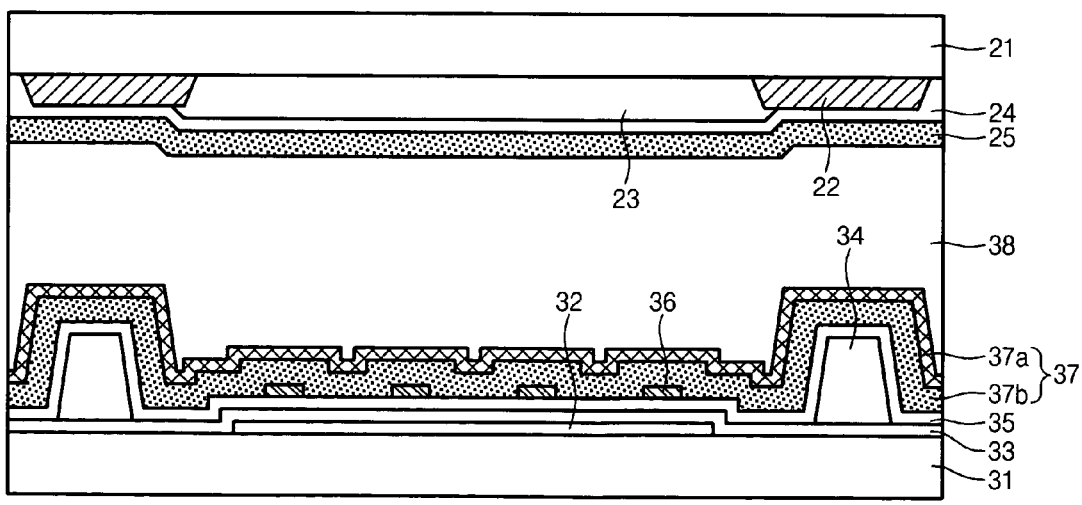
FIG. 2 is a sectional view showing an LCD, after precure, according to an embodiment of the present invention.
Figure 3:
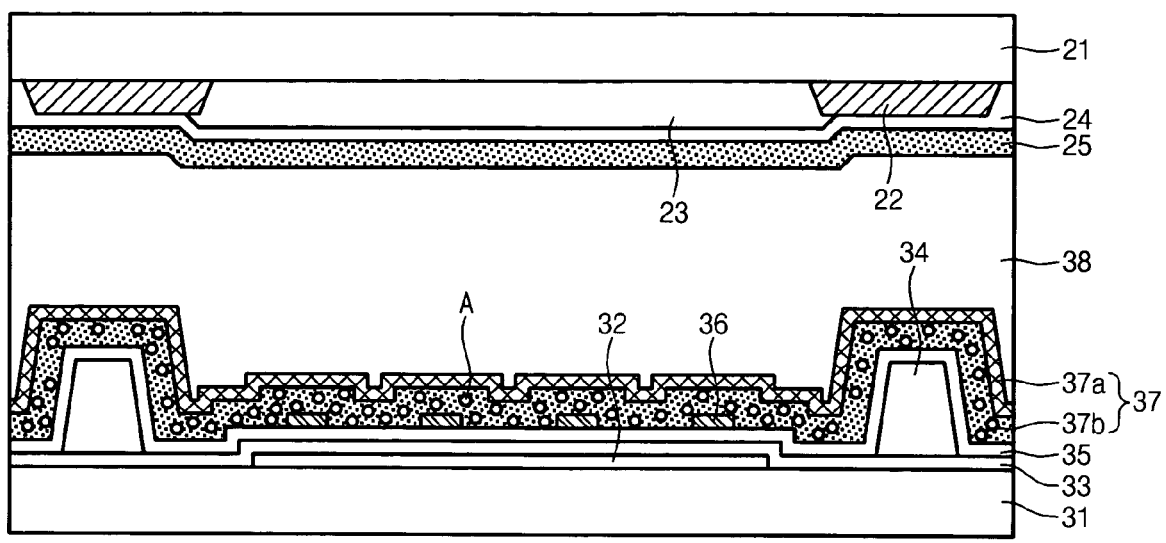
FIG. 3 is a sectional view showing an LCD, after maincure, according to an embodiment of the present invention.

FIG. 2 is a sectional view showing an LCD, after precure, according to an embodiment of the present invention and FIG. 3 is a sectional view showing an LCD, after maincure, according to an embodiment of the present invention.

As shown in FIG. 2, a black matrix layer 22 is formed on an upper substrate 21 to interrupt transmission of light and a color filter layer 23 including red, green, and blue is formed thereon. An over-coating layer 24 is formed on the black matrix layer 22 and the color filter layer 23. A common electrode 32 is formed on a lower substrate 31 in a plate shape, and a gate insulation layer 33 is formed on the resulting substrate including the common electrode 32. A data line 34 is formed on the gate insulation layer 33, and a protective layer 35 is formed on the resulting substrate including the data line 34. A pixel electrode 36 is formed on the protective layer 35 in a slit shape. Alignment layers 25 and 37 are formed between the upper substrate 21 and a liquid crystal layer 38 and between the lower substrate 31 and the liquid crystal layer 38, respectively, to determine the initial arrangement of liquid crystals.

In the present invention, the resulting substrate including the pixel electrode 36 is coated with an alignment agent to form an alignment layer 37 on the lower substrate 31. The alignment agent includes a polymer compound for arranging liquid crystals in a predetermined direction, a first solvent having low viscosity, low specific weight, and high volatility at a temperature of 70-80° C., and a second solvent having high specific weight and high volatility at a temperature of 100° C. or higher. As the lower substrate coated with the alignment agent is subject to heat treatment at a temperature of 70-80° C., the first solvent rapidly volatilizes from the surface layer of the alignment agent, while the surface is cured, to form a first alignment layer 37*a* having a smooth surface. The second solvent does not volatilize, due to high specific weight, and is distributed inside a second alignment layer 37*b* of the lower substrate 31 in a liquid state.

After being heated at a temperature of 70-80° C., the lower substrate 31 coated with the alignment agent is subject to heat treatment at an elevated temperature of 100° C. or higher for imidization through recombination of the polymer compound, as shown in FIG. 3, so that the second solvent volatilizes together with imidization of the alignment agent. The second solvent cannot be discharged from the surface of the alignment agent and forms bubbles A therein. As a result, air layer is formed inside the second alignment layer 37*b*. This reduces the capacitance of the alignment layers.

When the alignment agent is applied to the lower substrate, furthermore, the first solvent having low viscosity and low specific weight generates a difference in the amount of application between a high stepped-portion and a low stepped-portion. Such a difference in the amount of application varies the amount of bubbles generated by the second solvent and adjusts the thickness of the alignment layers according to the patterns of the lower substrate. As such, the difference in level of the patterns formed on the lower substrate is compensated for and alignment layers having excellent flatness are obtained.

As mentioned above, the LCD according to the present invention has bubbles formed inside the alignment layers for reduced capacitance thereof. The thickness of the alignment layers is adjusted according to the patterns of the lower substrate. This compensates for the difference in level of the patterns of the lower substrate and provides alignment layers having excellent flatness.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:
   lower and upper substrates provided with predetermined patterns, respectively, and positioned to face each other with a predetermined distance;
   a liquid crystal layer interposed between the lower and upper substrates; and
   alignment layers positioned between the lower substrate and the liquid crystal layer and the upper substrate and the liquid crystal layer, respectively, to determine the initial arrangement of liquid crystals, wherein
   the alignment layers have air bubbles formed therein to reduce the capacitance generated by the alignment layers and the difference in level of the lower substrate for improved image retention.

2. The liquid crystal display as claimed in claim 1, wherein the alignment layers comprise:
   a polymer compound for arranging the liquid crystals in a predetermined direction; and
   a first solvent and second solvent,
   wherein the second solvent has volatility higher than that of the first solvent.

\* \* \* \* \*